United States Patent [19]

Wykes et al.

[11] 4,374,326

[45] Feb. 15, 1983

[54] METHOD FOR DETERMINING THE PROPORTION OF AT LEAST ONE MATERIAL IN A MOVING MIXTURE OF MATERIALS

[75] Inventors: John S. Wykes, Allenton; Ian Adsley, Burton-on-Trent, both of England

[73] Assignee: Coal Industry (Patents) Limited, London, England

[21] Appl. No.: 178,420

[22] Filed: Aug. 15, 1980

Related U.S. Application Data

[62] Division of Ser. No. 911,247, May 31, 1978, Pat. No. 4,275,298.

[30] Foreign Application Priority Data

May 31, 1977 [GB] United Kingdom ............... 22941/77

[51] Int. Cl.³ .............................................. G01V 5/00
[52] U.S. Cl. .................................. 250/255; 250/359.1; 250/252.1; 378/58
[58] Field of Search ............... 250/253, 255, 328, 359, 250/252; 209/576

[56] References Cited

U.S. PATENT DOCUMENTS

| 2,717,693 | 4/1955 | Holmes | 250/303 |
| 3,007,052 | 10/1961 | Hickman et al. | 250/359 |
| 3,341,706 | 9/1967 | Swift et al. | 250/253 |
| 3,445,651 | 5/1969 | Starnes | 250/272 |
| 3,678,268 | 7/1972 | Reim et al. | 250/358 R |
| 3,732,420 | 5/1973 | Brunnett et al. | 250/252 |
| 4,118,623 | 10/1978 | Fertl et al. | 250/253 |

FOREIGN PATENT DOCUMENTS

| 478286 | 11/1951 | Canada | 209/576 |
| 762432 | 11/1956 | United Kingdom | 250/255 |

Primary Examiner—Alfred E. Smith
Assistant Examiner—Carolyn E. Fields
Attorney, Agent, or Firm—James C. Wray

[57] ABSTRACT

The proportion of a radioactive material in a moving mass of material is determined with a sensor which derives an output signal proportional to the mass of radioactive material. The output signal is calibrated against known reference values to give a quantitative value of mass. Problems associated with inhomogeneity of material distribution are overcome by averaging the sensed radiation over a time period. Background radiation can be sensed to determine sufficiency of material or it can be shielded from the sensor.

4 Claims, 9 Drawing Figures

METHOD FOR DETERMINING THE PROPORTION OF AT LEAST ONE MATERIAL IN A MOVING MIXTURE OF MATERIALS

This application is a division of application Ser. No. 911,247, filed 5-31-78, now U.S. Pat. No. 4,275,298.

This invention relates to a method of and apparatus for determining the proportion of at least one material in a moving mixture of materials. The invention is particularly suitable for determining the constituency of coal/stone on a conveyor belt.

According to one aspect, the present invention provides a method of determining the proportion of at least one material in a moving mixture of materials comprising sensing an intensity of radiation emitted by said at least one of the materials, deriving an electrical signal indicative of the sensed intensity and comparing the derived electrical signal with at least one preselected reference value to determine the proportion of said one of the materials in the mixture of materials.

Preferably, the mixture of materials is sensed over a time period and the intensity of radiation averaged.

According to another aspect the present invention provides apparatus for determining the constituency proportion of at least one material in a moving mixture of materials comprising a sensor for sensing an intensity of radiation emitted by said least one of the materials and for deriving an electrical signal indicative of the intensity and comparator means for comparing the derived electrical signal with at least one preselected reference value and for deriving a second electrical signal indicative of said comparison and consequently of the ratio of said one of the materials in the mixture of materials.

Advantageously, averaging circuitry is connected to the sensor for averaging the detected radiation intensity over a time period.

The sensor comprises scintillation crystals and a photomultiplier tube, the photomultiplier tube detecting scintillation which occur in all of the scintillation crystals.

Preferably, the scintillation crystals are mounted in a flexible optical coupling.

Conveniently, the scintillation crystals can vibrate independently.

The sensor is shielded from stray radiation.

The apparatus conveniently determines the constituency of mineral material transported on a mine conveyor, in which case the conveyor in the vicinity of the sensor is shielded.

Alternatively, the sensor is not shielded from stray radiation, in which case at least one of the materials acts to shield the sensor from stray radiation.

The apparatus also may comprise a belt weigher for determining the mass of material on the mine conveyor and for deriving third electrical signal indicative thereof.

Alternatively, the apparatus also may comprise an optical volume device for determining the volume of material on the conveyor.

An embodiment of the present invention will now be described by way of example with reference to the accompanying drawings in which.

In coal workings for example mixtures of coal and shale or stone are transported on conveyors. The shale or stone can arise from rock strata adjacent to a coal seam or from a dirt band within that seam when the seam is mined. It is necessary that transport of coal and stone throughout the conveyor network be monitored and controlled and for this purpose that constituencies of mixtures of shale and coal is known.

Figure 1:
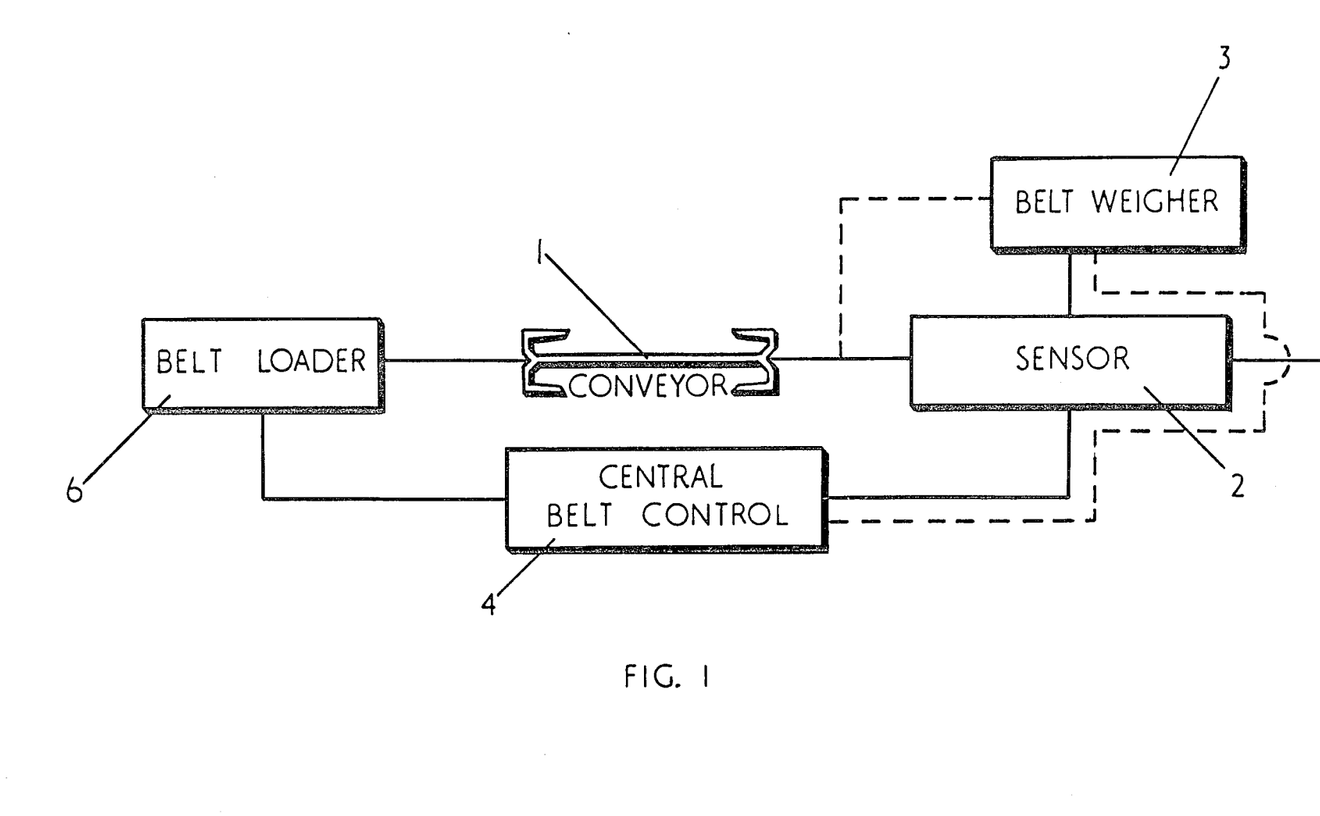
FIG. 1 is a block electrical circuit diagram including the present invention.

An overall control system is shown in FIG. 1, wherein a conveyor is generally indicated at 1. The conveyor is carrying mineral materials (not shown in FIG. 1, but shown in FIG. 2). A sensor 2 is positioned adjacent to the conveyor which sensor senses natural gamma radiation derived by said mineral materials. The sensor 2 has electrical circuitry associated therewith to derive an electrical signal indicative of an intensity of the sensed radiation. The electrical circuitry is further described below. A further sensor, in this example a conveyor belt weigher 3 is positioned in the vicinity of the sensor 2 so that the quantity of material on the conveyor belt can be determined. The belt weigher derives a further electrical signal indicative of said quantity.

The signals from the sensor 2 and the belt weigher 3 are fed to a central belt control 4. The central belt control 4 processes the received signals, and, if necessary, derives a control signal for a belt loader mechanism 6. The belt loader can cause more or less of one or more of the materials to be added to the belt.

Both signals are required to determine the constituency of material on the conveyor belt unless the quantity of material on the belt remains substantially constant, or above a certain amount (as will be explained below) in which cases the signals from the sensor 2 only is required. Utilization of the signals from the sensor 2 and belt weigher 3 is described below.

The conveyor 1 and sensor means 2 are now described in more detail with reference to FIGS. 2 and 3. The conveyor is drawn schematically and may be seen to comprise support brackets 10, 11 and rollers 12, 14 mounted on the brackets 10, 11 respectively. Conveyor belt 16 (or scraper chain) runs across the rollers 12, 14. Other conveyors (not shown) can comprise a different number of brackets and/or rollers. Mineral material 18 is transported by the belt 16.

The sensor 2 comprises scintillation crystals 21 of, for example sodium iodide, a photomultiplier 22, a preamplifier and high tension supply 24 and a counting unit 25 comprising an amplifier and ratemeter.

The counting unit 25 is connected to a comparator means 26 containing a supply 27 for preselected comparison values i.e. a store of reference values. The counting unit also includes an averaging circuit 25' which is used to help overcome the problem of inhomogeneous mineral loading as will be explained. The output of the comparator is connected to the central belt control as aforesaid.

Figure 4:
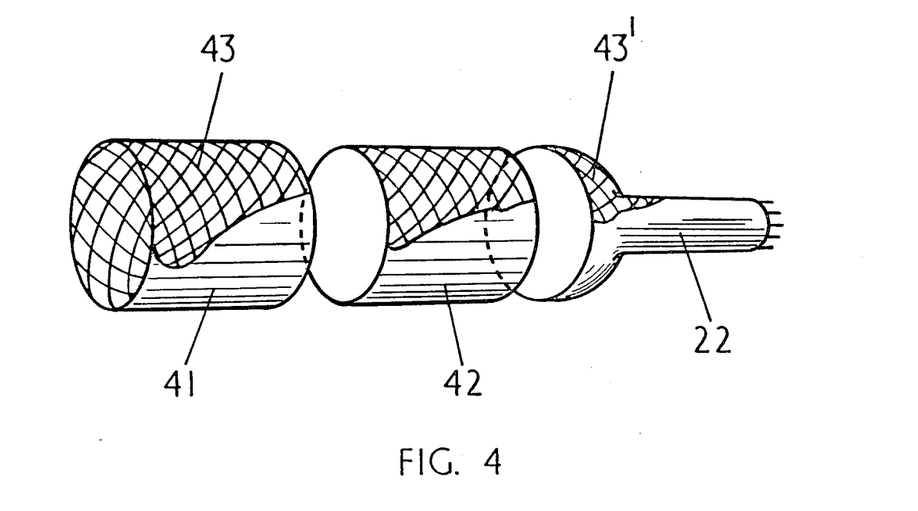
FIG. 4 is a diagrammatic view showing a crystal arrangement employed in the radiation sensor.

Referring now to FIG. 4, there is shown a crystal arrangement of sufficient volume to detect the weak radiation which exists in a coal mine. The two scintillation crystals 21 are now shown at 41 and 42 respectively. Each crystal is of a generally cylindrical shape and is dimensioned such that its diameter is of substantially the same magnitude as its length. Such a dimension of crystal offers a greater resistance to shattering than dimensions having differing diameters and lengths.

The crystals 41 and 42 are coated with an optically opaque material 43. The photomultiplier tube 22 is coated with a further optically opaque material 43'. The opaque materials 43 and 43' are only partly shown in FIG. 4 for clarity but in fact it covers the curved faces of both crystals and the end face of crystal 41 away from crystal 42.

The photomultiplier tube 22 is situated adjacent to the crystal 42 on the side away from the crystal 41. The crystal arrangement described ensures that optical activity occurring in either of the crystals 41 or 42 is visible to the photomultiplier tube 22, activity in crystal 41 being transmitted through crystal 42. External optical activity is cut off from the photomultiplier by the optically opaque materials 43 and 43'.

Figure 5:
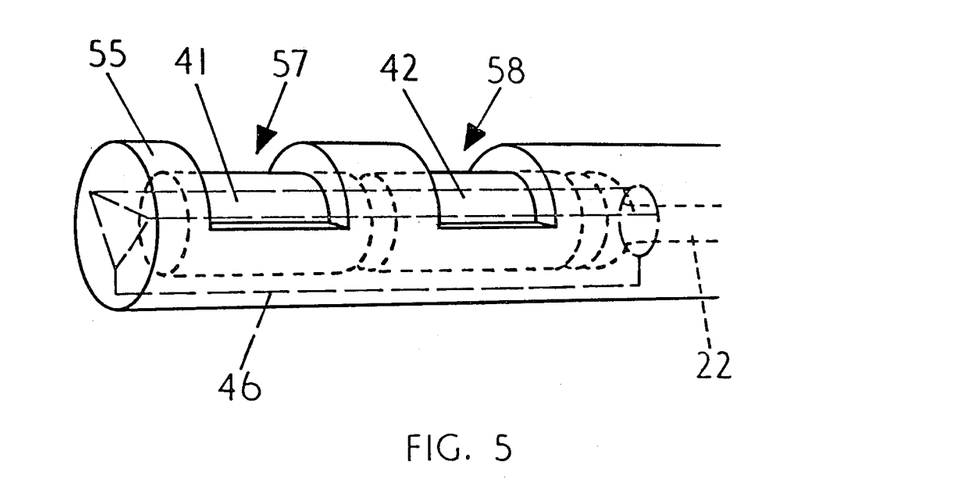
FIG. 5 is a view similar to FIG. 4, but omitting some detail and showing some more different detail.

Referring now to FIG. 5, the crystal arrangement of FIG. 4 is shown supported by a flexible optical coupling which is preferably a resilient silicone rubber compound 55. The crystals are surrounded by the opaque material 43, but this is omitted for clarity. The resilient silicone rubber compound 55 is cutaway over part of the crystals 41 and 42 and cut-outs 57 and 58 are shown adjacent to crystals 41 and 42 respectively. The cut-outs are provided so that low energy gamma rays can reach the crystal and not be attenuated in the silicone rubber. A skeletal support 46 holds the crystals and photomultiplier in general alignment to facilitate potting. The skeletal support 46 does not obstruct the cut-outs 57 and 58.

Referring back now to FIGS. 2 and 3, the crystal arrangement is shown in a sensor 30 which is situated in an industrial environment.

The crystal arrangement is potted in a container 31 which is light in weight, gamma tranparent and optically opaque. The container 31 is mounted in a container 32 which is substantially opaque to gamma radiation. Resilient pads 33 are inserted between the containers 31 and 32 to cushion the container 31 from vibration and shock received by the outer container 32.

Figure 2:
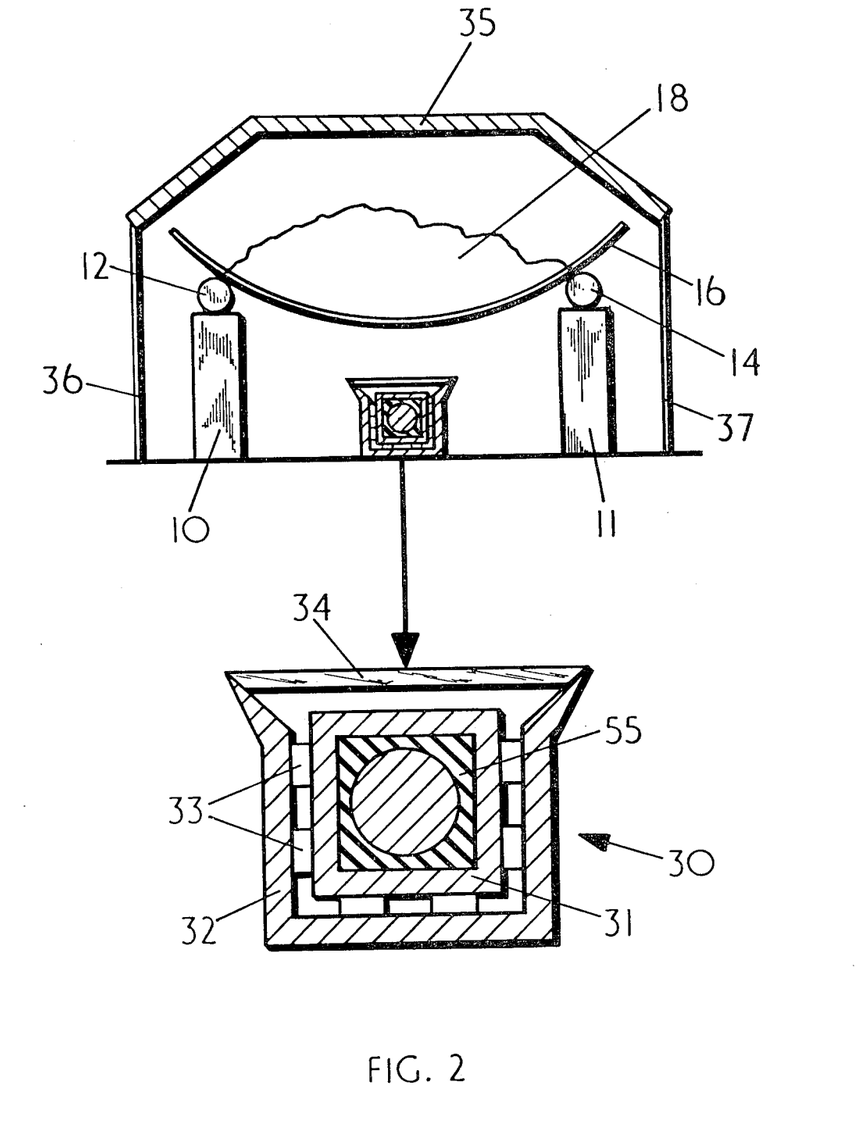
FIG. 2 is an incomplete side sectional view of the apparatus of the present invention, the section being along II—II of FIG. 3 next below described.
Figure 3:
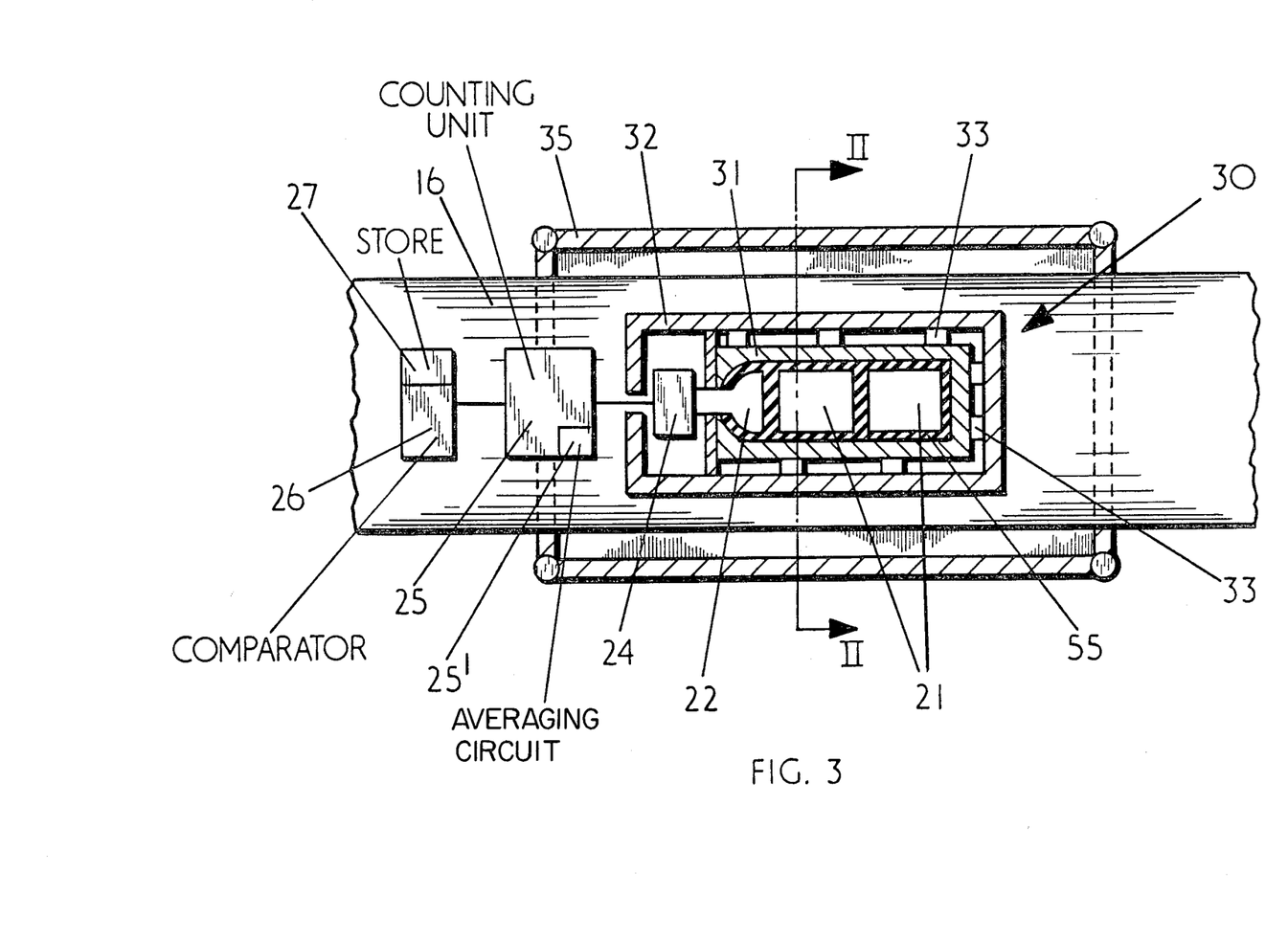
FIG. 3 is a partly sectioned plan of FIG. 2 showing more detail of a radiation sensor.

In FIG. 2 the upper face of 34 of the sensor is shown. The face 34 is a window of a gamma transparent material preferably polycarbonate which has a high strength to weight ratio. The size of the gamma transparent window is adjusted so that only radiation collimated by the shielding i.e. radiation coming to the crystals from the solid angle subtended at the crystals by the window is received.

A further radiation shield 35 is mounted over the conveyor 1 to prevent stray radiation impinging on the scintillation crystals 21, through the window 34. The shield 35 is mounted upon legs 36 and 37. Consequently only radiation collimated by the shielding geometry and received from the mineral on the belt will actuate the crystals 21.

For correct understanding of the invention, which is now described, it should be appreciated that coal emits substantially no natural gamma radiation in comparison with shale and stone which latter emit a measurable quantity of natural radiation.

Mineral transported on the conveyor can range from all coal to all shale/stone and comprise any ratio of materials between. It can happen in loading the conveyor that although there is a fixed ratio of coal to stone on the belt, the material is loaded inhomogeneously. Thus for example, the mineral or the belt may be 50% coal and 50% shale and in extreme cases of inhomogeneity, all the coal will be towards the top of the conveyed mineral or alternatively all the stone will be towards the top of the conveyed mineral.

Figure 6:
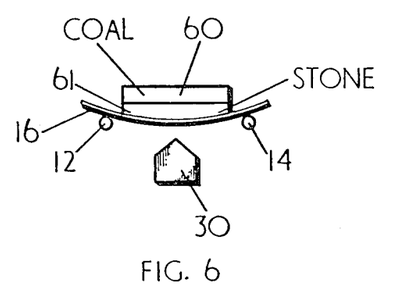
FIG. 6 shows a diagrammatic arrangement of a possible configuration of part of FIG. 2.
Figure 7:
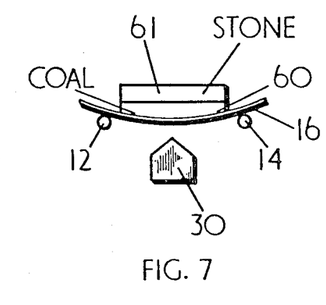
FIG. 7 is a similar view to FIG. 6 but of a different configuration.

FIG. 6, which has the same reference numerals as previous Figures where appropriate, shows such a possible extreme inhomogeneity of belt loading. Coal 60 is located towards the top of conveyed mineral and shale/stone 61 is located towards the bottom of the conveyed material. FIG. 7 is a similar Figure to FIG. 6 except that shale/stone is located towards the top of the conveyed mineral and coal is located towards the bottom of the conveyed material.

Figure 8:
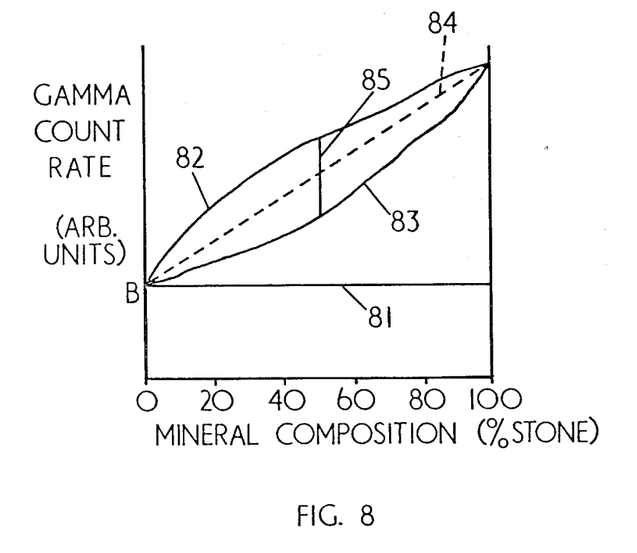
FIG. 8 shows a graph of performance parameters for the configuration of FIGS. 6 and 7.

Turning now to FIG. 8, there is shown a graph with gamma count rate plotted as ordinate and mineral composition as abscissa. The level of background radiation is indicated by a line 81. A curve 82 shows the radiation detected from the inhomogeneous mineral conveyor loading of FIG. 6 and a curve 83 shows the radiation detected from the inhomogeneous mineral conveyor loading of FIG. 7. A line 84 represents an average count rate for the extremes of FIGS. 6 and 7. For a 50% proportion of coal therefore, the natural gamma count could fall anywhere along a line 85. It can be seen that mineral inhomogeneity can cause a similar gamma count rate to be detected for compositions varying by as much as 40% in stone content. It is therefore desirable that in operation a curve such as that shown at 84 be used so that such variations are avoided. The actual gamma count rate depends upon the natural mean vertical distribution of coal and stone/shale in the mineral. Avoidance of difficulties associated with inhomogeneous mineral loadings in operation is described below.

Figure 9:
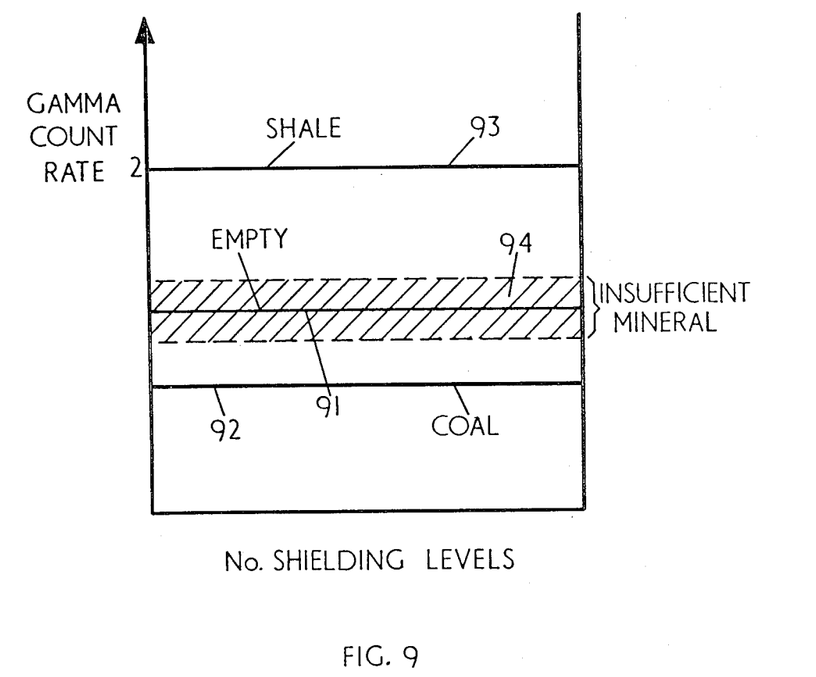
FIG. 9 shows a graph of further performance parameters of the invention.

Referring to FIG. 9, there is shown a graph with gamma count rate plotted as ordinate. The count rates are plotted from a sensor which is unshielded, that is to say that the shield 35 is not arranged over the conveyor as previously described with reference to FIGS. 2 and 3. Consequently, there is a background radiation count level which produces a count level indicated at 91. When coal alone is on the conveyor, the background radiation reaching the sensor through the coal is less than that for an unloaded conveyor, so that a count level indicated by 92 occurs. Where shale/stone alone is on the conveyor, the radiation detected by the sensor is increased owing to natural radiation emitted by the stone/shale so that a count level indicated by 93 occurs. A band 94 for count rate occurs around the conveyor empty level 91 and a count anywhere in this band indicates that insufficient material is on the belt (or another alarm situation) as will be explained below in operation.

In operation of the sensor 30 (now described with reference to FIGS. 2, 3, 4 and 5), radiation comprising typically low energy gamma radiation, is emitted from the material 18. The radiation passes through the conveyor to the sensor 30. The sensor receives the radiation through the window 34, the radiation being collimated by the shielding so as to be from a desired volume of interest for material on the conveyor, and upon striking the scintillation crystals 41 and 42, the radiation causes light flashes. The flashes are detected by the photomultiplier tube 22 which derives an electrical signal in response to the flashes. Flashes in crystal 41 are seen by the photomultiplier tube 22 through the crystal 42.

The crystals 41 and 42 can vibrate separately in response to mechanical shocks which may be experienced by the sensor 30 and so are not subject to forces which may cause them to shatter. Even so, the crystals are optically coupled by the transparent silicone rubber compound 55. The optical shielding 43 on the crystals prevents stray light from impairing their operation.

Consequently, the sensor 30 has a scintillation crystal arrangement which offers a crystal volume of twice the size of a single crystal but which does not have a large crystal which is liable to fracture in use. Moreover the crystal arrangement is long and thin so that it can be slid into restricted spaces whereas a single crystal of the same size would have a diameter equal to its length and so would be bulky.

In operation, now described with reference to all the figures, suppose that the mineral on the belt is entirely coal, then substantially no activity will be recorded in the scintillation crystal and consequently a lowest of the preselected values in the comparator means 26 is not exceeded by a signal from the counting unit 25. The comparator, therefore, transmits a signal to the central belt control indicating that said lowest value has not been exceeded and thus that pure coal is on the belt.

Now, suppose that the mineral on the belt is all shale or stone; then the greatest operational activity will be recorded in the scintillation crystals 21 and consequently a highest of the pre-selected values in supply 27 for the comparator means 26 is exceeded by a signal from the counting unit 25. The comparator, therefore, transmits a signal to the central belt control indicating that said highest value is exceeded and thus that there is substantially no coal on the belt.

Clearly, in practice the proportion of coal on the belt can vary between substantially none and substantially all of the transported mineral. The intensity of natural radiation, therefore, falls between the extreme values above. Consequently the comparator contains a plurality of preselected values in addition to and between the aforementioned lowest and highest preselected values. The signal transmitted to the central belt control is indicative of which of the preselected value the signal from the counting unit fell between and thus the output of the comparator transmitted to the central belt control is indicative of the ratio of coal to stone or shale in the mineral transported since for each ratio one of the preselected values is exceeded.

As has been explained above, the mineral on the conveyor can be distributed inhomogeneously giving rise to different indicated values of radiation for the same proportion of shale/stone on the belt (see FIGS. 6, 7 and 8). This problem is overcome in operation by running the belt for about a time sufficient for the conveyor to travel five to ten meters usually for about a few seconds, so that a plurality of values of count along a line such as 85 in FIG. 8 are received. These values are then averaged by the averaging circuit 25'. Consequently, the averaged counted value will lie somewhere along the curve 84 of FIG. 8 depending upon the proportion of stone/shale to coal.

The comparator means preferably comprises a pre-programmed microprocessor arrangement, in which case the pre-selected values would be a continuous spectrum rather than discrete values.

The output signal from the comparator means is processed by the central belt control 4 in response to further signals received from the belt weigher 3 since otherwise when the sensor 2 indicated a greater radiation intensity, the central belt control would assume this to be due to a greater proportion of shale, when in fact it could be due to a greater mass of transported material. Operation of the belt weigher 3 ensures that faulty operation does not occur when different values of mass of material are on the belt. However, as mentioned above, the belt weigher is redundant when the quantity of material on the belt remains substantially constant. The belt weigher is also redundant when the quantity of material on the belt remains greater than a certain "saturation" value of loading. Above this saturation value, radiation from mineral furthest from the belt is attenuated by mineral closer to the belt so that for any fixed proportion of shale in the mineral the "saturation" value of radiation for that proportion cannot be increased by increasing the mass of material on the belt.

The central belt control 4 receives the output signal from the comparator means and the signal from the further sensor i.e. the belt weigher, and processes them to deduce the constituency of material on the belt. The central belt control derives control signals to operate the belt loader 6 to add more or less coal, or more or less coal/shale to the conveyor as the case may be so that the constituency of material on the belt can be maintained within desired operational limits.

When the shield 35 is not positioned over the conveyor so that count rates as described above in connection with FIG. 9 are made by the sensor, then the comparator means is programmed to alarm the system if the count rate falls with the band indicated at 94 in FIG. 9. When the count rate does fall in the band 94, then there is insufficient material on the belt because there is either insufficient coal to attenuate the background radiation to a level outside band 4 or insufficient stone/shale to move the detected count outside the band. The width of the band is adjusted for each installation so that a countrate in the band does indicate insufficient material as aforesaid although of course for freak conditions where the radiation emitted by the stone/shale and attenuated by the coal is of equal intensity to the background radiation then a misleading reading can result. However, such freak conditions are generally avoided by programming the comparator means to ensure that the band 94 falls outside value of count rate normally detected in the particular installation. Optimum control conditions occur when the conveyor has a known loading which is controlled by for example metering, doors (not shown). In installations where the material is either substantially all coal or substantially all shale, the unshielded sensor can be used merely to discriminate between all coal and all stone/shale on the conveyor.

In a different embodiment of the invention, the natural gamma radiation sensor can differentiate between energies which incoming gamma rays may have. Thus the sensor can tell the quantity of different types of materials on the belt, all of which different types emit gamma rays of different characteristic energy. Such a sensor can comprise a plurality of scintillation crystals with varying amounts of shield so as to be able to detect varying gamma ray energies.

In another embodiment of the invention, the further sensor could comprise an optical volume measuring device instead of the belt weigher device described above. Such an optical volume device comprises a television camera or like scanner which determines the area of cross section of material on the belt and combines this with the flow velocity of the conveyor to determine the volume of material on the belt. The cross section is determined at a point where the conveyor has an abrupt change of direction or determined from a shadow shape cast up the material on the belt.

In a further embodiment the invention could be utilized to determine the constiuency of mixtures of coal and rock in mine cars or in other transporting equipment for coal and shale/stone.

From the above description it can be seen that the present invention provides a method and apparatus for determining the constituency of mixtures of materials which facilitate monitoring of transport of coal and stone.

We claim:

1. A method of determining the proportion of at least one material in a moving inhomogeneous mixture of coal, and stone or shale materials comprising moving an inhomogeneous mixture of materials past a radiation sensor, shielding the radiation sensor, sensing over a period of time an intensity of radiation emitted by at least one of the materials in the moving mixture, deriving electrical signals indicative of the sensed intensity, compensating for variations in the derived signals due to the inhomogeneity of the mixture by averaging the derived signals and further deriving a signal indicative of averaged intensity of radiation, comparing the further derived averaged radiation intensity signal with at least one preselected reference value of signal corresponding to a known proportion, and determining the proportion of said at least one material in the mixture of materials.

2. A method as claimed in claim 1, wherein background radiation is sensed in order to determine whether there is sufficient materials being moved.

3. The method of claim 1 wherein the shielding step comprises shielding the radiation sensor from background radiation with the moving mixture of materials.

4. The method of claim 1 wherein the shielding step comprises shielding the radiation sensor and the moving mixture of materials near the sensor.

* * * * *